M. B. WEBSTER.
Loose Pulley.

No. 215,188. Patented May 6, 1879.

Witnesses:
J. W. Garner
John Irwin, Jr.

Inventor:
M. B. Webster,
per
F. A. Lehmann,
atty

UNITED STATES PATENT OFFICE.

MILO B. WEBSTER, OF BURLINGTON, IOWA.

IMPROVEMENT IN LOOSE PULLEYS.

Specification forming part of Letters Patent No. 215,188, dated May 6, 1879; application filed March 27, 1879.

*To all whom it may concern:*

Be it known that I, MILO B. WEBSTER, of Burlington, in the county of Des Moines and State of Iowa, have invented certain new and useful Improvements in Loose Pulleys; and I do hereby declare the following to be a full, clear, and exact description of the invention, such as will enable others skilled in the art to which it pertains to make and use it, reference being had to the accompanying drawings, which form part of this specification.

My invention relates to an improvement in loose pulleys; and it consists in arranging upon the shaft, between it and the hub of the pulley, two concentric layers of sleeves, made in sections of different lengths, and upon which the pulley revolves, so as to prevent both the shaft and the pulley from being worn, as will be more fully described hereinafter.

Figure 1:
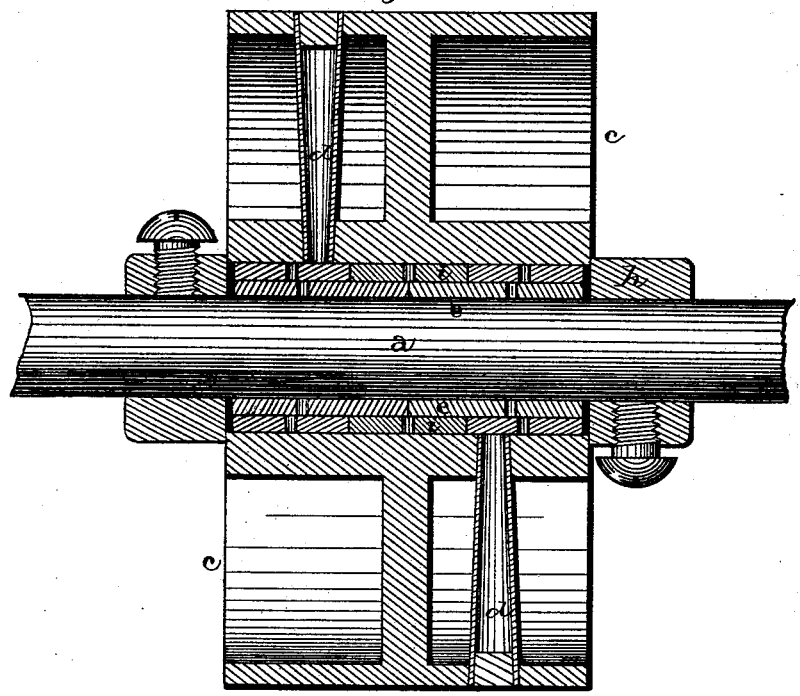
Figure 2:
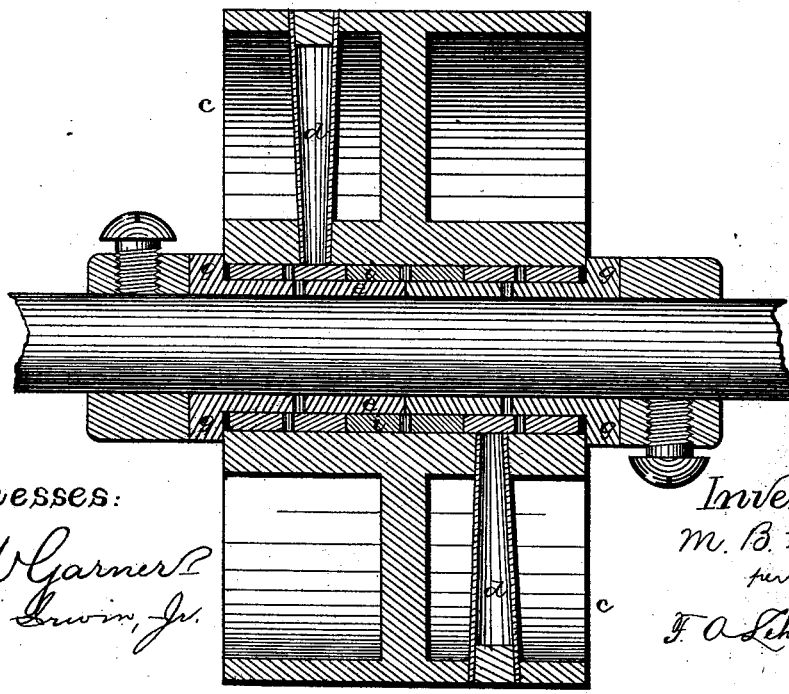

Figure 1 is a vertical longitudinal section of my invention. Fig. 2 is a similar view of a pulley having one set of the sectional sleeves provided with flanges.

$a$ represents the shaft, and $c$ a common loose pulley revolving thereon. The opening through the center of the pulley for the shaft to pass through is made much longer than usual, and between this hub and the shaft are placed the two sets of concentric sleeves $e$ $i$. The inner sleeves, $e$, consist of only two parts, while the outer one, $i$, consists of three shorter pieces, both sets having suitable oil-holes made through them, as shown. By having these sleeves divided into different lengths the joints are broken, and thus an equal distribution of the oil is insured, whereby both sets of sleeves are caused to move equally.

Passing through both the rim and the hub of the pulley are the oil-tubes $d$, which are filled through their outer ends, and then these ends are closed. As soon as the pulley begins to revolve this oil works down into the sleeves and keeps them all lubricated alike.

In order to keep the pulley and the sleeves in place and the oil within the hub, the usual collars $h$ are used.

If so desired, the inner sleeves, $e$, may have the flanges $g$ formed upon their outer ends of such a width as to extend up above the sleeves $i$ placed upon them, and grasp the ends of the hub between them.

The constant rotation of the loose pulley on the shaft soon wears both the shaft and the inside of the hub of the pulley, necessitating in time a renewal of both. The object of my sleeves is to prevent so much wear upon any one place, and this is accomplished by having the sleeves slip and slide over each other to such an extent that the wear either upon the shaft, hub, or sleeves is scarcely appreciable. By thus having two sets of sleeves a loose pulley can be made to run for years without a renewal or repairs, and cause a diminution of speed from hub of pulley to shaft.

Having thus described my invention, I claim—

1. The combination of a loose pulley, $c$, with the two concentric sets of sectional sleeves $e$ $i$, one set being comprised of sections longer than the sections of the other, so as to break the joints and better distribute the oil among the moving parts, substantially as shown.

2. The combination, with a loose pulley, $c$, of the two concentric sets of sectional sleeves $e$ $i$, comprised of sections of different lengths, the sleeves $e$ being provided with the flanges $g$, which reach up above the ends of the sleeve $i$ and grasp the ends of the pulley, substantially as set forth.

In testimony that I claim the foregoing I have hereunto set my hand this 24th day of March, 1879.

MILO BURGESS WEBSTER.

Witnesses:
 EDWARD THOMAS,
 LEOPOLD SEIBERLICH.